(12) United States Patent
Novozhenets

(10) Patent No.: US 11,942,804 B2
(45) Date of Patent: Mar. 26, 2024

(54) WIRELESS CHARGING LOCKING DEVICE

(71) Applicant: Carrier Corporation, Palm Beach Gardens, FL (US)

(72) Inventor: Yuri Novozhenets, Pittsford, NY (US)

(*) Notice: Subject to any disclaimer, the term of this patent is extended or adjusted under 35 U.S.C. 154(b) by 334 days.

(21) Appl. No.: 17/249,035

(22) Filed: Feb. 18, 2021

(65) Prior Publication Data

US 2021/0281087 A1  Sep. 9, 2021

Related U.S. Application Data

(60) Provisional application No. 62/985,961, filed on Mar. 6, 2020.

(51) Int. Cl.
| | | |
|---|---|---|
| H02J 7/00 | (2006.01) | |
| H02J 7/02 | (2016.01) | |
| H02J 50/10 | (2016.01) | |
| H02J 50/80 | (2016.01) | |

(52) U.S. Cl.
CPC ............ H02J 7/00032 (2020.01); H02J 7/02 (2013.01); H02J 50/10 (2016.02); H02J 50/80 (2016.02)

(58) Field of Classification Search
USPC .............. 320/106, 107, 108, 109, 110, 112
See application file for complete search history.

(56) References Cited

U.S. PATENT DOCUMENTS

| | | |
|---|---|---|
| 8,922,333 B1 | 12/2014 | Kirkjan |
| 9,444,925 B2 | 9/2016 | McKelvey |
| 9,779,567 B1 | 10/2017 | Shen |
| 10,089,844 B2 | 10/2018 | Hu et al. |
| 10,147,254 B1 | 12/2018 | Shen |
| 2015/0332527 A1 | 11/2015 | Pukari |
| 2018/0351388 A1 | 12/2018 | Orris et al. |
| 2019/0315311 A1 | 10/2019 | Björkengren |
| 2021/0210989 A1* | 7/2021 | Goodchild ............. H02J 50/12 |

FOREIGN PATENT DOCUMENTS

| | | | |
|---|---|---|---|
| CN | 102222393 A | * | 10/2011 |
| CN | 204791238 U | * | 11/2015 |
| CN | 106437310 A | * | 2/2017 |
| CN | 106437310 A | | 2/2017 |
| JP | 2009287251 A | * | 12/2009 |
| WO | 2015190955 A1 | | 12/2015 |
| WO | 2018186512 A1 | | 10/2018 |
| WO | WO-2019030385 A1 | * | 2/2019 |

OTHER PUBLICATIONS

Extended European Search Report received in EP Application No. 21159868.5, dated Jul. 6, 2021, 9 pages.

* cited by examiner

*Primary Examiner* — Brian Ngo

(57) ABSTRACT

A system for wirelessly transmitting power between a mobile device and a locking device is provided. In one embodiment power is wirelessly transmitted from the locking device to the mobile device. In another embodiment power is wirelessly transmitted from the mobile device to the locking device. In both embodiments power is transmitted wirelessly when the storage of power is below a critical level in one of the devices (e.g., the mobile device or the locking device). When the power is at a critical level the device (e.g., mobile device or locking device) may not be able to complete a function (e.g., transmit an access credential or actuate a mechanical or electronic lock). As such, wirelessly transmitting power between the mobile device and the locking device may enable the function to be completed.

20 Claims, 3 Drawing Sheets

WIRELESS CHARGING LOCKING DEVICE

CROSS REFERENCE TO A RELATED APPLICATION

The application claims the benefit of U.S. Provisional Application No. 62/985,961 filed Mar. 6, 2020, the contents of which are hereby incorporated in their entirety.

BACKGROUND

Locking devices (e.g., access control readers, lockboxes, and hotel locks) can be used to control various types of environments. Access control readers can be used to regulate the entry into and movement within a building. Lockboxes can be used to control the access to one or more item inside the lockbox (e.g., a key for a door to a home). Hotel locks can be used to limit access to a hotel room. Each of these locking devices may be capable of granting access based upon the presentation of valid credentials. These credentials may be presented to the various locking devices using an RFID card, a card with a magnetic stripe, and/or a mobile device.

When using an RFID card to present credentials, the RFID card typically does not include a battery, so in order to transmit the credentials to the locking device the locking device must energize the RFID card (e.g., using radio waves). When using a card with a magnetic stripe to present credentials, the card must be physically swiped in order to transmit the credentials to the locking device. However, both the RFID card and the card with the magnetic stripe require a user to carry an additional item (i.e. the card). As such, many locking devices are moving toward direct communication with mobile devices, where instead of having to carry a card, a mobile device is used to transmit the credentials. One downside of using mobile devices to transmit credentials to the locking devices is the mobile device's reliance on the battery within the mobile device being charged in order to transmit the credentials. Meaning that when the battery in the mobile phone is low the mobile device may not be able to transmit the credentials to the locking device. This problem may be conversely true for locking devices that operate using a battery as well. For example, in situations where the mobile device is charged, the locking device may be non-responsive due to the battery in the locking device being low.

Accordingly, there remains a need for a system to transmit power between a mobile device and a locking device.

BRIEF DESCRIPTION

According to one embodiment, a system for wirelessly transmitting power between a mobile device and a locking device is provided. The mobile device includes a wireless power coil, a communication module, and at least one battery. The wireless power is configured to receive power. The communication module is configured to wirelessly transmit an access credential. The at least one battery is configured to supply power to at least the communication module. The at least one battery has a storage of power. The at least one battery is configured to store at least a portion of the power received by the wireless power coil. The locking device includes a wireless power coil and an authentication module. The wireless power coil is configured to wirelessly transmit power to the wireless power coil of the mobile device. The authentication module is configured to receive and authenticate the access credential. The access credential may be received from the communication module of the mobile device. The authentication module is operatively connected to a lock actuator. The lock actuator is configured to lock or unlock a mechanical or electronic lock when the access credential is authenticated. The system may provide for power to be wirelessly transmitted from the locking device to the mobile device when the storage of power is below a critical level.

In accordance with additional or alternative embodiments, the lock actuator is located, at least partially, within the locking device.

In accordance with additional or alternative embodiments, wirelessly transmitting power to the wireless power coil of the mobile device enables the communication module to transmit the access credential.

In accordance with additional or alternative embodiments, the critical level is approximately 5% of a maximum level.

In accordance with additional or alternative embodiments, the locking device further includes a wired power supply configured to supply power to the locking device, at least a portion of the power transmitted from the locking device to the mobile device being from the wired power supply.

In accordance with additional or alternative embodiments, the locking device further includes at least one battery for configured to supply power to the locking device, at least a portion of the power transferred from the locking device to the mobile device may be from the at least one battery.

In accordance with additional or alternative embodiments, the wireless transmission of power is Qi enabled.

In accordance with additional or alternative embodiments, the access credential is transmitted using at least one of: Bluetooth, Bluetooth Low Energy (BTLE), Wi-Fi, Zigbee, infrared, and cellular.

In accordance with additional or alternative embodiments, the authentication module of the locking device is configured to receive an access credential from at least one of: an RFID card and/or a card with a magnetic stripe.

According to another aspect of the disclosure, a system for wirelessly transmitting power between a mobile device and a locking device is provided. The locking device includes a wireless power coil, an authentication module, and at least one battery. The wireless power coil is configured to receive power. The authentication module is configured to receive and authenticate an access credential. The authentication module is operatively connected to a lock actuator. The lock actuator is configured to lock or unlock a mechanical or electronic lock when the access credential is authenticated. The at least one battery is configured to supply power to at least the lock actuator. The at least one battery has a storage of power. The at least one battery is configured to store at least a portion of power received by the wireless power coil. The mobile device includes a wireless power coil, a communication module, and at least one battery. The wireless power coil is configured to wirelessly transmit power to the wireless power coil of the locking device. The communication module is configured to transmit the access credential to the authentication module of the locking device. The at least one battery is configured to supply power to at least the wireless power coil. At least a portion of the power transferred from the mobile device to the locking device may be from the at least one battery. The system may provide the power to be wirelessly transmitted from the mobile device to the locking device when the storage of power is below a critical level.

In accordance with additional or alternative embodiments, the lock actuator is located, at least partially, within the locking device.

In accordance with additional or alternative embodiments, wirelessly transmitting power to the wireless power coil of the locking device enables the lock actuator to lock or unlock the mechanical or electronic lock.

In accordance with additional or alternative embodiments, the critical level is approximately 5% of a maximum level.

In accordance with additional or alternative embodiments, the access credential is transmitted using at least one of: Bluetooth, Bluetooth Low Energy (BTLE), Wi-Fi, Zigbee, infrared, and cellular.

In accordance with additional or alternative embodiments, the authentication module of the locking device is configured to transmit a confirmation signal to the communication module of the mobile device when the access credential is authenticated.

In accordance with additional or alternative embodiments, the confirmation signal includes instructions to charge the at least one battery of the locking device, when the storage of power is below a critical level.

In accordance with additional or alternative embodiments, the wireless power coil of the mobile device is configured to wirelessly transmit power to the wireless power coil of the locking device if the confirmation signal is not received within a threshold time.

In accordance with additional or alternative embodiments, the threshold time is five (5) seconds.

In accordance with additional or alternative embodiments, the wireless transmission of power is Qi enabled.

In accordance with additional or alternative embodiments, the authentication module of the locking device is configured to receive an access credential from at least one of: an RFID card and/or a card with a magnetic stripe.

BRIEF DESCRIPTION OF THE DRAWINGS

The subject matter, which is regarded as the disclosure, is particularly pointed out and distinctly claimed in the claims at the conclusion of the specification. The following descriptions of the drawings should not be considered limiting in any way. With reference to the accompanying drawings, like elements are numbered alike:

DETAILED DESCRIPTION

Locking devices (e.g., access control readers, lockboxes, and hotel locks) may grant or deny access to a particular environment based on whether or not valid credentials are received from a requesting device (e.g., a mobile device). Locking devices and mobile devices each may rely on a battery within the respective device to complete a function (e.g., the mobile device may rely on a battery to transmit an access credential, and the locking device may rely on a battery to actuate a mechanical or electronic lock). When the battery in the mobile device or the battery in the locking device does not contain enough power (e.g., when the power is at a critical level) the device may not be able to complete the function. Often, however, one of the devices has available power that could, if transmitted to the other device, enable the other device to complete the function. Accordingly, in certain instances, it may be advantageous to transmit power between devices when one of the devices does not have enough power to complete a function.

For example, when the battery in the mobile device is at a critical level it may be beneficial to transmit power from the locking device to the mobile device to enable the mobile device to transmit an access credential. Additionally, when the battery in the locking device is at a critical level it may be beneficial to transmit power from the mobile device to the locking device to enable the locking device to actuate a mechanical or electronic lock. To avoid the need of a connecting cable to transmit the power, the transmission of power between devices may be completed wirelessly.

To enable wireless charging between the locking device and the mobile device, each device may include a wireless power coil. The term "wireless power coil" may include any electrically conductive structure capable of transmitting and/or receiving power. Each wireless power coil may be made of conductive wire, configured in a three dimensional or two dimensional planar shape. The term "wireless power coil" may be viewed as either singular or plural (e.g., each coil may be made of one continuous wire, or may include multiple wires). The wireless power coil in each device may allow power to transfer between devices using induction (e.g., electromagnetic induction). In certain instances, the wireless transmission of power between the locking device and the mobile device is Qi enabled. Meaning that the transfer of power between the locking device and the mobile device may follow standardized procedures such as, for example, procedures described in a Qi specification by Wireless Power Consortium.

Figure 1:
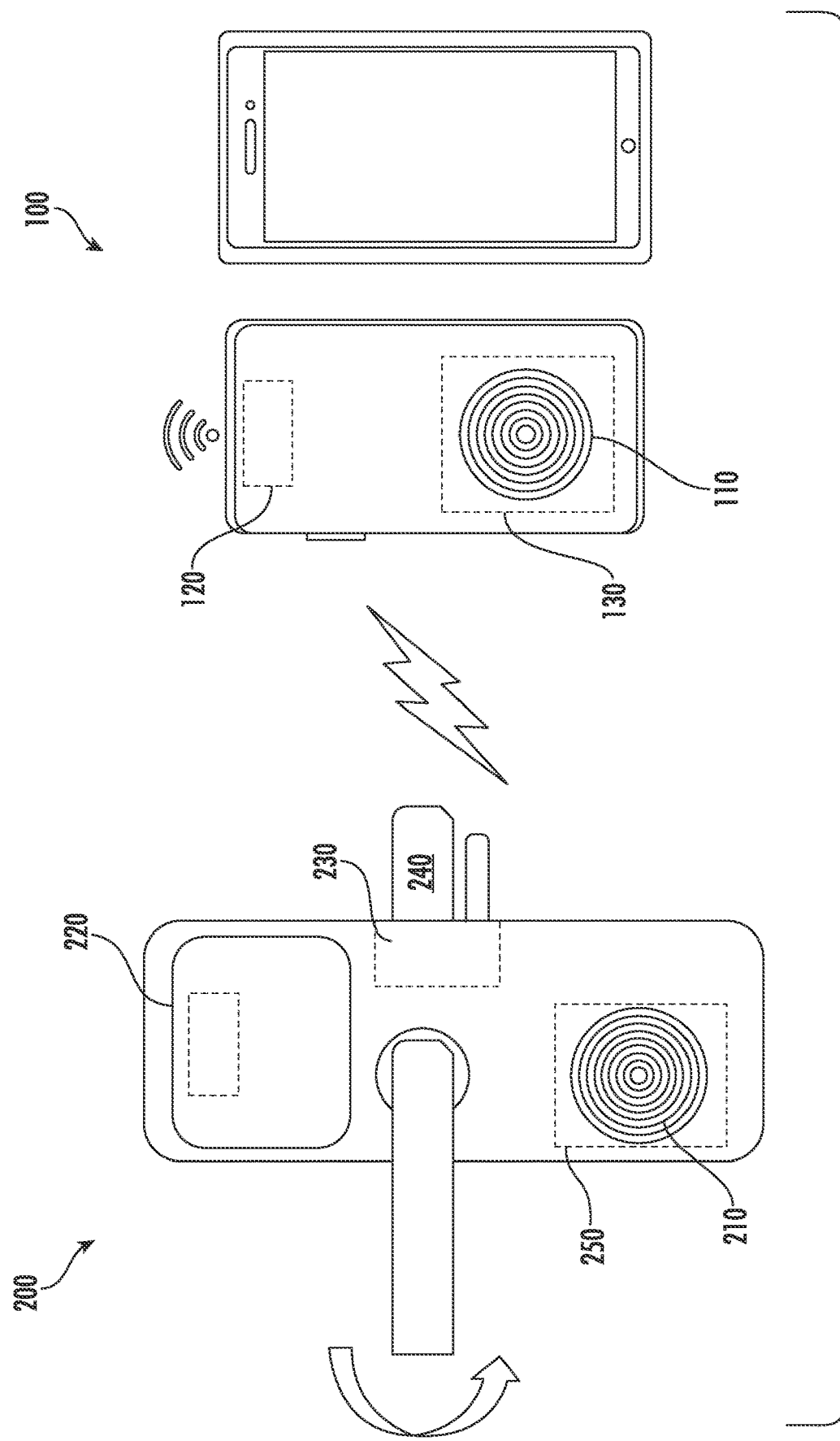
FIG. 1 is a schematic illustration of a mobile device with a first embodiment of a locking device in accordance with one aspect of the disclosure.
Figure 2:
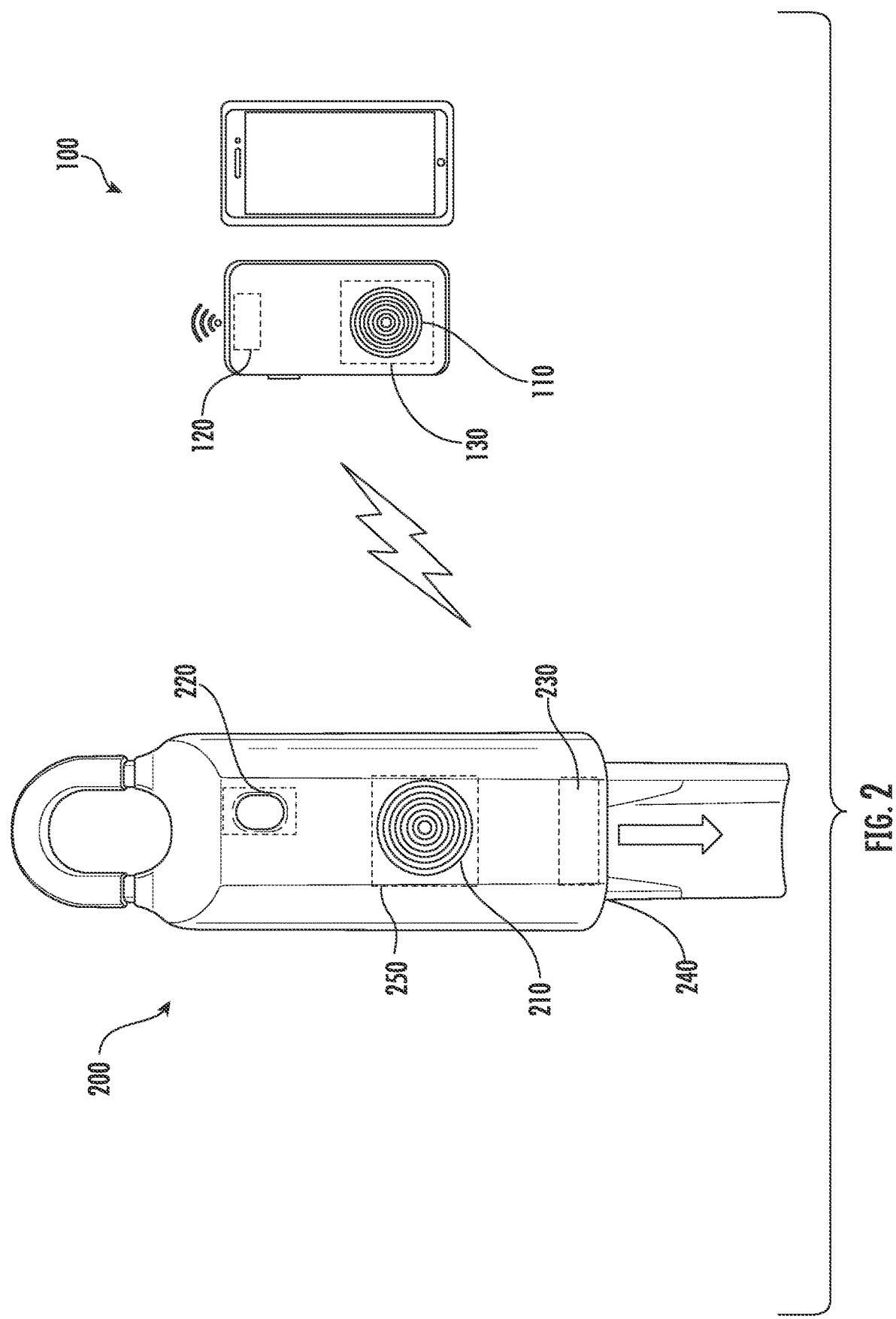
FIG. 2 is a schematic illustration of a mobile device with a second embodiment of a locking device in accordance with one aspect of the disclosure.
Figure 3:
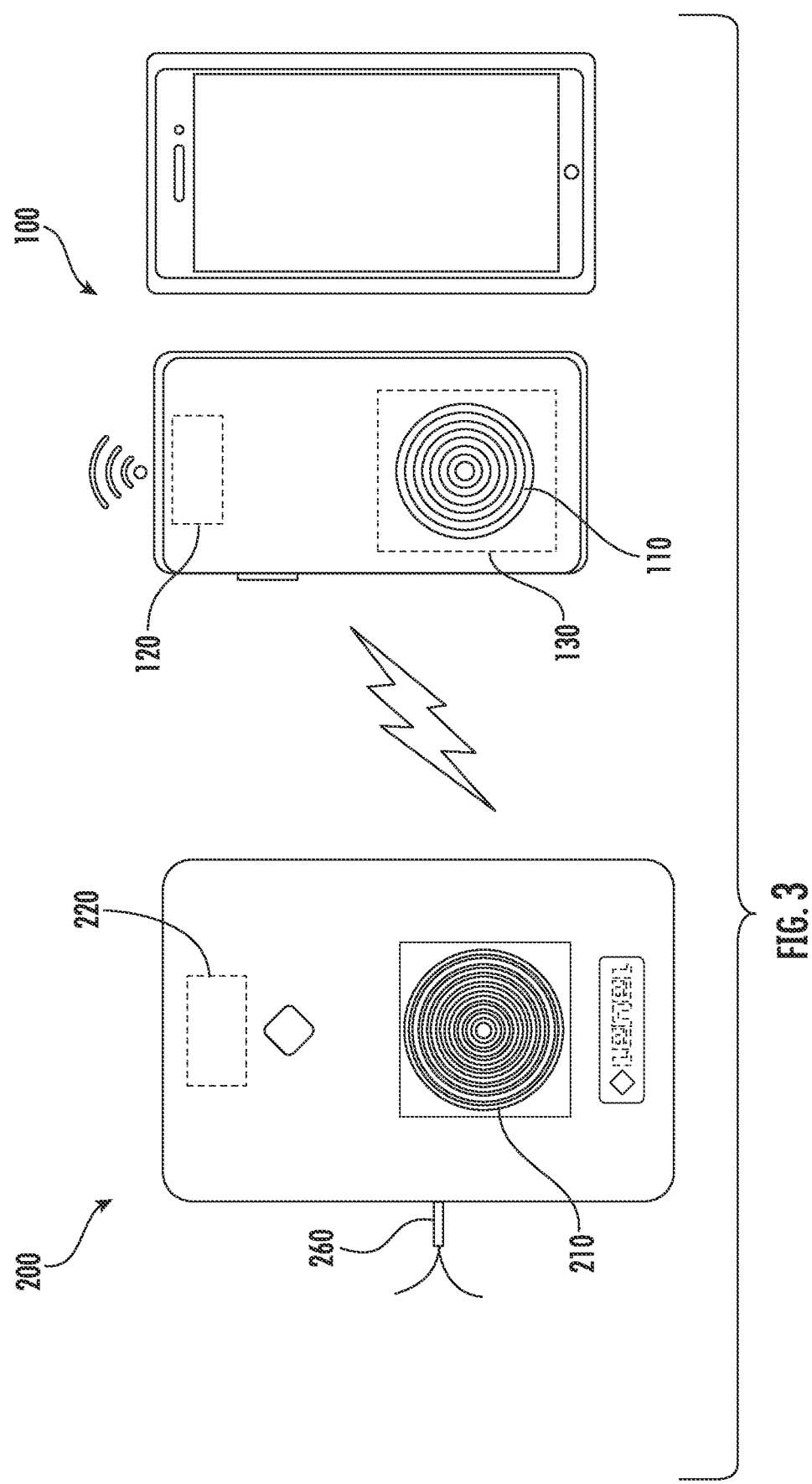
FIG. 3 is a schematic illustration of a mobile device with a third embodiment of a locking device in accordance with one aspect of the disclosure.

With reference now to the Figures, various schematic illustrations of a system for wirelessly transmitting power between a mobile device 100 and a various embodiments of a locking device 200 are shown in FIGS. 1-3. FIG. 1 illustrates the wireless transmission of power between a mobile device 100 and a first embodiment of a locking device 200. FIG. 2 illustrates the wireless transmission of power between a mobile device 100 and a second embodiment of a locking device 200. FIG. 3 illustrates the wireless transmission of power between a mobile device 100 and a third embodiment of a locking device 200. Regardless of the embodiment, the mobile device 100 includes a wireless power coil 110, a communication module 120 configured to wirelessly transmit an access credential (e.g., using Bluetooth, Bluetooth Low Energy (BTLE), Wi-Fi, Zigbee, infrared, cellular or any other short-range or long-range wireless communication method known to one skilled in the art), and at least one battery 130 configured to supply power to at least the communication module 120. The locking device 200, in each embodiment, includes a wireless power coil 210, an authentication module 220 configured to receive and authenticate the access credential (e.g., from the communication module 120 of the mobile device 100). Although described herein to receive the access credential from a mobile device 100, it is envisioned that the locking device 200 may be configured to receive an access credential from at least one of an RFID card and/or a card with a magnetic stripe. Regardless of how the access credential is provided to the locking device 200, the authentication module 220, through being operatively connected to the lock actuator 230, may lock or unlock a mechanical or electronic lock 240 when the access credential is authenticated.

The system, in certain instances, is configured to wirelessly transmit power from the locking device 200 to the mobile device 100. When power is provided from the locking device 200 to the mobile device 100, the wireless power coil 110 of the mobile device 100 may be configured to receive power, and the wireless power coil 210 of the locking device 200 may be configured to wirelessly transmit power. The transfer of power from the locking device 200 to the mobile device 100 may occur when the storage of power in the battery 130 of the mobile device 100 is below a critical level. When the storage of power in the battery 130 of the mobile device 100 gets below a critical level the communication module 120 may not be able to send the access credential, as the battery 130 does not contain enough power to transmit the signal containing the credentials. In certain instances the system is provided such that the power is wirelessly transmitted from the locking device 200 to the mobile device 100 to enable the mobile device 100 to transmit the access credential to the locking device 200. Being at a critical level may mean that the mobile device 100 is not able to complete a function (e.g., transmit an access credential) due to the amount of power left in the battery 130. This critical level may, in certain instances, be when less than approximately 5% of a maximum level of power is remaining in the battery 130.

As shown in FIGS. 1 and 2, which depict the first embodiment and the second embodiment, respectively, of the locking device 200, the locking device 200 may include at least one battery 250 configured to supply power to the locking device 200. The first embodiment (shown in FIG. 1) of the locking device 200 may function as a hotel lock. The second embodiment (shown in FIG. 2) of the locking device 200 may function as a lockbox. When including at least one battery 250 in the locking device 200, at least a portion of the power transmitted from the locking device 200 to the mobile device 100 may be from the at least one battery 250.

As shown in FIG. 3, which depicts the third embodiment of the locking device 200, the locking device 200 may include a wired power supply 260 configured to supply power to the locking device 200. The third embodiment of the locking device 200 may function as an access control reader. When the locking device 200 includes a wired power supply 260, at least a portion of the power transmitted from the locking device 200 to the mobile device 100 may be from the wired power supply 260. The wired power supply 260 may connect the locking device 200 with an electrical grid in order to provide power for the locking device 200. The electrical grid may be viewed as the interconnected network for delivering electricity from producers to consumers (e.g., electrical power distributed from one or more distribution line to a home or business). This electrical power, in certain instances, may be transferred to the home or business prior to being distributed to the locking device 200.

In certain instances the system is configured to wirelessly transmit power from the mobile device 100 to the locking device 200. When power is provided from the mobile device 100 to the locking device 200 the wireless power coil 210 of the locking device 200 may be configured to receive power, and the wireless power coil 110 of the mobile device 100 may be configured to wirelessly transmit power. The transfer of power from the mobile device 100 to the locking device 200 may occur when the storage of power in the battery 250 of the locking device 200 is below a critical level. When the storage of power in the battery 250 of the locking device 200 gets below a critical level the lock actuator 230 may not be able to lock or unlock the mechanical or electronic lock 240 of the locking device 200, as the battery 250 does not contain enough power to actuate the mechanism of the lock 240. In certain instances, the system is provided such that the power is wirelessly transmitted from the mobile device 100 to the locking device 200 to enable the lock actuator 230 to lock or unlock the mechanical or electronic lock 240. Being at a critical level may mean that the locking device 200 is not able to complete a function (e.g., actuate the lock) due to the amount of power left in the battery 250. This critical level may, in certain instances, be when less than approximately 5% of a maximum level of power is remaining in the battery 250.

As shown in FIGS. 1-3, the configuration of the lock actuator 230 and the mechanical or electronic lock 240 may differ for each embodiment of the locking device 200. For the first embodiment (shown in FIG. 1) the lock actuator 230 may be an electrical connection to a dead bolt, where the dead bolt is the lock 240. At least a portion of the lock actuator 230 (e.g., the electrical actuation mechanism) may be located within the locking device 200. When in a locked position (e.g., when the dead bolt is extended), the lock 240, in combination with the frame of the door, may prevent the door from being opened. As shown in FIG. 1, this embodiment of the locking device 200 may rely on a battery 250 to supply power to at least the lock actuator 230. As such, it may be advantageous in this embodiment to transmit power from the mobile device 100 to the locking device 200 when the storage of power in the battery 250 is below a critical level. Supplying power from the mobile device 100 to the locking device 200 may enable the lock actuator 230 to extend or retract the lock 240 for the door.

For the second embodiment (shown in FIG. 2) the lock actuator 230 may be an electrical connection to a latching mechanism, where the latching mechanism is the lock 240. The latching mechanism may hold a compartment for a key to a house within the locking device 200. At least a portion of the lock actuator 230 (e.g., the electrical actuation mechanism) may be located within the locking device 200. When in a locked position (e.g., when the compartment is held inside the locking device 200), the lock 240 (i.e. the latching mechanism) may prevent the compartment from coming outside of the locking device 200, which may prevent access to the key. As shown in FIG. 2, this embodiment of the locking device 200 may rely on a battery 250 to supply power to at least the lock actuator 230. As such, it may be advantageous in this embodiment to transmit power from the mobile device 100 to the locking device 200 when the storage of power in the battery 250 is below a critical level. Supplying power from the mobile device 100 to the locking device 200 may enable the lock actuator 230 to release the compartment holding the key to the house.

For the third embodiment (shown in FIG. 3) the locking device 200, as described above, may include a wired power supply 260 configured to supply power to the locking device 200. The locking device 200, depicted as an access control reader, may be viewed to be connected to another locking device 200 (i.e. a door controller), which controls the locking mechanism of a door. The door controller may be similar to the embodiment shown in FIG. 1, where instead of having the authentication module 220 on the door controller, the authentication module 220 is located on the access control reader (i.e. the locking mechanism 200 depicted in FIG. 3). The door controller may hold the door in a locked state until valid credentials are presented to the authentication module 220 of the access control reader (i.e. the locking device 200). Once valid credentials are presented, the access control reader may instruct the door controller to open the locking mechanism of the door. Although not depicted, in certain instances the door controller may rely on a battery (not shown) to supply power. As such, it may be advantageous in this embodiment to transmit power from the mobile device 100 to the door controller (i.e. a locking device 200) when the storage of power in the battery in the door controller is below a critical level. Supplying power from the mobile device 100 to the door controller (i.e. a locking device 200) may enable the lock for the door to extend or retract.

In certain instances, the locking device 200 is in two-way communication with the mobile device 100. For example, the authentication module 220 of the locking device 200 may be configured to transmit a confirmation signal to the communication module 120 of the mobile device 100 when the access credential is authenticated. This confirmation signal, in certain instances, includes instructions to charge the battery 250 of the locking device 200 (e.g., when the storage of power in the battery 250 is below a critical level). Whether or not the mobile device 100 transmits power to the locking device 200 may be dependent on whether or not a confirmation signal is received within a threshold time. For example, if the mobile device 100 does not receive a confirmation signal from the locking device 200 within five (5) seconds of transmitting the access credentials, the wireless power coil 110 of the mobile device 100 may wirelessly transmit power to the wireless power coil 210 of the locking device 200.

Whether or not the authentication module 220 is capable of transmitting a confirmation signal may be dependent on the battery 250 containing enough power (e.g., if the battery 250 in the locking device 200 does not contain enough power, the authentication module 220 will not be able to transmit the confirmation signal). As such, when a confirmation signal is not received, it can be assumed that the battery 250 in the locking device 200 is low, and is in need of a charge. Whether or not a confirmation signal is received may also be indicative as to whether or not the locking device 200 is capable of completing a function (e.g., actuating the mechanical or electronic lock 240). As described above, whether or not the locking device 200 is capable of completing a function may be dependent on the battery 250 containing enough power. As such, this confirmation signal may inform a user that the locking device 200 is in need of a charge before the locking device 200 can complete a function (e.g., actuate the lock).

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A system for wirelessly transmitting power between a mobile device and a locking device, the system comprising:
   a mobile device comprising:
      a wireless power coil configured to receive power;
      a communication module configured to wirelessly transmit an access credential; and
      at least one battery configured to supply power to at least the communication module, the at least one battery comprising a storage of power, the at least one battery configured to store at least a portion of the power received by the wireless power coil;
   a locking device comprising:
      a wireless power coil configured to wirelessly transmit power to the wireless power coil of the mobile device; and
      an authentication module configured to receive and authenticate the access credential, the access credential being received from the communication module of the mobile device, the authentication module operatively connected to a lock actuator, the lock actuator configured to lock or unlock a mechanical or electronic lock when the access credential is authenticated;
   wherein the power is wirelessly transmitted from the locking device to the mobile device when the storage of power is below a critical level, and wherein
   the authentication module of the locking device is configured to transmit a confirmation signal to the communication module of the mobile device when the access credential is authenticated, the confirmation signal comprising instructions to charge the at least one battery of the locking device, when the storage of power is below the critical level, and
   the wireless power coil of the mobile device is configured to wirelessly transmit power to the wireless power coil of the locking device if the confirmation signal is not received within a threshold time.

2. The system of claim 1, wherein the lock actuator is located, at least partially, within the locking device.

3. The system of claim 1, wherein wirelessly transmitting power to the wireless power coil of the mobile device enables the communication module to transmit the access credential.

4. The system of claim 1, wherein the critical level is approximately 5% of a maximum level.

5. The system of claim 1, wherein the locking device further comprises a wired power supply configured to supply power to the locking device, at least a portion of the power transmitted from the locking device to the mobile device being from the wired power supply.

6. The system of claim 1, wherein the locking device further comprises at least one battery for configured to supply power to the locking device, at least a portion of the power transferred from the locking device to the mobile device being from the at least one battery.

7. The system of claim 1, wherein the wireless transmission of power is Qi enabled.

8. The system of claim 1, wherein the access credential is transmitted using at least one of: Bluetooth, Bluetooth Low Energy (BTLE), Wi-Fi, Zigbee, infrared, and cellular.

9. The system of claim 1, wherein the authentication module of the locking device is configured to receive an access credential from at least one of: an RFID card and/or a card comprising a magnetic stripe.

10. A system for wirelessly transmitting power between a mobile device and a locking device, the system comprising:
    a locking device comprising:
       a wireless power coil configured to receive power;
       an authentication module configured to receive and authenticate an access credential, the authentication module operatively connected to a lock actuator, the lock actuator configured to lock or unlock a mechanical or electronic lock when the access credential is authenticated; and
       at least one battery configured to supply power to at least the lock actuator, the at least one battery comprising a storage of power, the at least one battery configured to store at least a portion of power received by the wireless power coil;
a mobile device comprising:
  a wireless power coil configured to wirelessly transmit power to the wireless power coil of the locking device;
  a communication module configured to transmit the access credential to the authentication module of the locking device; and
  at least one battery configured to supply power to at least the wireless power coil, at least a portion of the power transferred from the mobile device to the locking device being from the at least one battery;
wherein the power is wirelessly transmitted from the mobile device to the locking device when the storage of power is below a critical level, wherein
the authentication module of the locking device is configured to transmit a confirmation signal to the communication module of the mobile device when the access credential is authenticated, the confirmation signal comprising instructions to charge the at least one battery of the locking device, when the storage of power is below the critical level, and
the wireless power coil of the mobile device is configured to wirelessly transmit power to the wireless power coil of the locking device if the confirmation signal is not received within a threshold time.

11. The system of claim 10, wherein the lock actuator is located, at least partially, within the locking device.

12. The system of claim 10, wherein wirelessly transmitting power to the wireless power coil of the locking device enables the lock actuator to lock or unlock the mechanical or electronic lock.

13. The system of claim 10, wherein the critical level is approximately 5% of a maximum level.

14. The system of claim 10, wherein the access credential is transmitted using at least one of: Bluetooth, Bluetooth Low Energy (BTLE), Wi-Fi, Zigbee, infrared, and cellular.

15. The system of claim 10, wherein the authentication module of the locking device is configured to transmit a confirmation signal to the communication module of the mobile device when the access credential is authenticated.

16. The system of claim 15, wherein the confirmation signal comprises instructions to charge the at least one battery of the locking device, when the storage of power is below a critical level.

17. The system of claim 15, wherein the wireless power coil of the mobile device is configured to wirelessly transmit power to the wireless power coil of the locking device if the confirmation signal is not received within a threshold time.

18. The system of claim 17, wherein the threshold time is five (5) seconds.

19. The system of claim 10, wherein the wireless transmission of power is Qi enabled.

20. The system of claim 10, wherein the authentication module of the locking device is configured to receive an access credential from at least one of: an RFID card and/or a card comprising a magnetic stripe.

* * * * *